United States Patent
Simmons

(10) Patent No.: US 7,509,150 B1
(45) Date of Patent: Mar. 24, 2009

(54) REDUCING POWER CONSUMPTION IN A RADIO DEVICE BY EARLY RECEIVER SHUT DOWN

(75) Inventor: Charles A. Simmons, Fort Wayne, IN (US)

(73) Assignee: ITT Manufacturing Enterprises, Inc., Wimington, DE (US)

( * ) Notice: Subject to any disclaimer, the term of this patent is extended or adjusted under 35 U.S.C. 154(b) by 599 days.

(21) Appl. No.: 11/194,464

(22) Filed: Aug. 2, 2005

(51) Int. Cl.
    *H04M 1/00* (2006.01)
(52) U.S. Cl. .................................. 455/574; 370/321
(58) Field of Classification Search ................. 455/502, 455/67.15, 436, 574, 127.5; 370/321, 337, 370/347
    See application file for complete search history.

(56) References Cited

U.S. PATENT DOCUMENTS

| | | | |
|---|---|---|---|
| 4,964,121 A | 10/1990 | Moore | |
| 5,392,287 A | 2/1995 | Tiedmann, Jr. et al. | |
| 5,541,929 A | 7/1996 | Jokura | |
| 5,570,369 A | 10/1996 | Jokinen | |
| 5,666,355 A | 9/1997 | Huah et al. | |
| 5,774,057 A | 6/1998 | Kalbermatter | |
| 6,058,289 A | 5/2000 | Gardner et al. | |
| 6,311,081 B1 | 10/2001 | Northcutt et al. | |
| 6,411,830 B2 | 6/2002 | Alon et al. | |
| 6,628,675 B1 | 9/2003 | Neufeld | |
| 6,633,753 B1 * | 10/2003 | Kido | ........................ 455/343.2 |
| 6,728,234 B1 | 4/2004 | Hofmann et al. | |
| 6,788,924 B1 | 9/2004 | Knutson et al. | |
| 2002/0045443 A1 * | 4/2002 | Hunzinger | .................. 455/421 |

* cited by examiner

*Primary Examiner*—Tu X Nguyen
(74) *Attorney, Agent, or Firm*—Edell, Shapiro & Finnan, LLC

(57) ABSTRACT

A power savings technique is provided for a radio communication device. The technique involves reducing the amount of time that a receiver is powered-up during a time interval that the radio communication device may receive a transmission from another radio communication device. This time interval is referred to as a reception time interval, though it may also correspond to a time interval that the device may transmit to another device if the device is in a transmit mode. This method involves delaying enablement of the receiver for a relatively short first time interval that begins at the start of the reception time interval. When the first time interval expires, the receiver is enabled for at least a second time interval so that the device can detect whether a synchronization pattern is occurring, indicative of a radio transmission being sent for the device. The duration of the second time interval is such that it expires well before the end of the reception time interval. If the device does not detect the synchronization pattern during the second time interval, the receiver is powered-down or disabled. The durations of the first and second time intervals may be set by first and second timers, respectively. Consequently, the receiver is disabled before the end of the reception interval when there is no transmission to the device that is to be received.

15 Claims, 5 Drawing Sheets

REDUCING POWER CONSUMPTION IN A RADIO DEVICE BY EARLY RECEIVER SHUT DOWN

This invention was made with Government support under Agreement No. DAAB07-03-9-K601 awarded by the United States Army. The Government has certain rights in the invention.

FIELD OF THE INVENTION

The present invention relates to radio communication systems and devices, and more particularly to power saving techniques for radio communication devices.

BACKGROUND OF THE INVENTION

Portable radio communication devices are designed to be intentionally put into a transmit mode, and are otherwise in a receive mode. This reduces power consumption since the transmit operation usually consumes a significant amount of power. In time division multiple access (TDMA) based systems, each device is assigned a time slot for either transmitting to another device or receiving a signal from another device. Depending on traffic congestion in the network, not every assigned slot for which a device is in receive mode will have an active transmission from another device. Thus, the device will keep its receiver on for the entire assigned time slot even when there is no transmission to receive.

Receiver power consumption is still significant, and can reduce battery life of a portable communication device, necessitating more frequent battery changes or charges. Receiver usage also contributes to average power consumption, which is related to system temperature and other more complex thermal management techniques. With the ever increasing demand for smaller portable radio transceiver devices, reducing power consumption even of a receiver can have a significant impact in future radio communication devices and applications.

A technique is needed to reduce power consumption associated with a radio receiver in a radio communication device by minimizing the amount of time that the radio receiver is enabled.

SUMMARY OF THE INVENTION

Briefly, a method is provided for reducing power consumption of a radio communication device. The method involves reducing the amount of time that a receiver is powered-up during a time interval that the radio communication device may receive a transmission from another radio communication device. This time interval is referred to as a reception time interval, though it may also correspond to a time interval that the device may transmit to another device if the device is in a transmit mode. Whereas prior art radio communication devices enable their receivers for the entire time duration of a reception time interval, this method involves delaying enablement of the receiver for a relatively short first time interval that begins at the start of the reception time interval. When the first time interval expires, the receiver is enabled for at least a second time interval so that the device can detect whether a synchronization pattern is occurring, indicative of a radio transmission being sent for the device. The duration of the second time interval is such that it expires well before the end of the reception time interval. If the device does not detect the synchronization pattern during the second time interval, the receiver is powered-down or disabled. The durations of the first and second time intervals may be set by first and second timers, respectively. Consequently, the receiver is disabled before the end of the reception interval when there is no transmission to the device that is to be received.

The power savings techniques described above may be incorporated in a radio communication device that operates in a time division multiple access (TDMA) system where each radio communication device is assigned a time slot for transmission or reception. Thus, the aforementioned reception time interval would correspond to an assigned time slot for a communication device operating in a TDMA system. These techniques are also applicable in a system that uses handshaking protocols such as Request to Send (RTS)/Clear to Send (CTS), Message/Acknowledgement, etc.

Other objects and advantages will become more readily apparent when reference is made to the following description taken in conjunction with the accompanying drawings.

DETAILED DESCRIPTION

Figure 1:
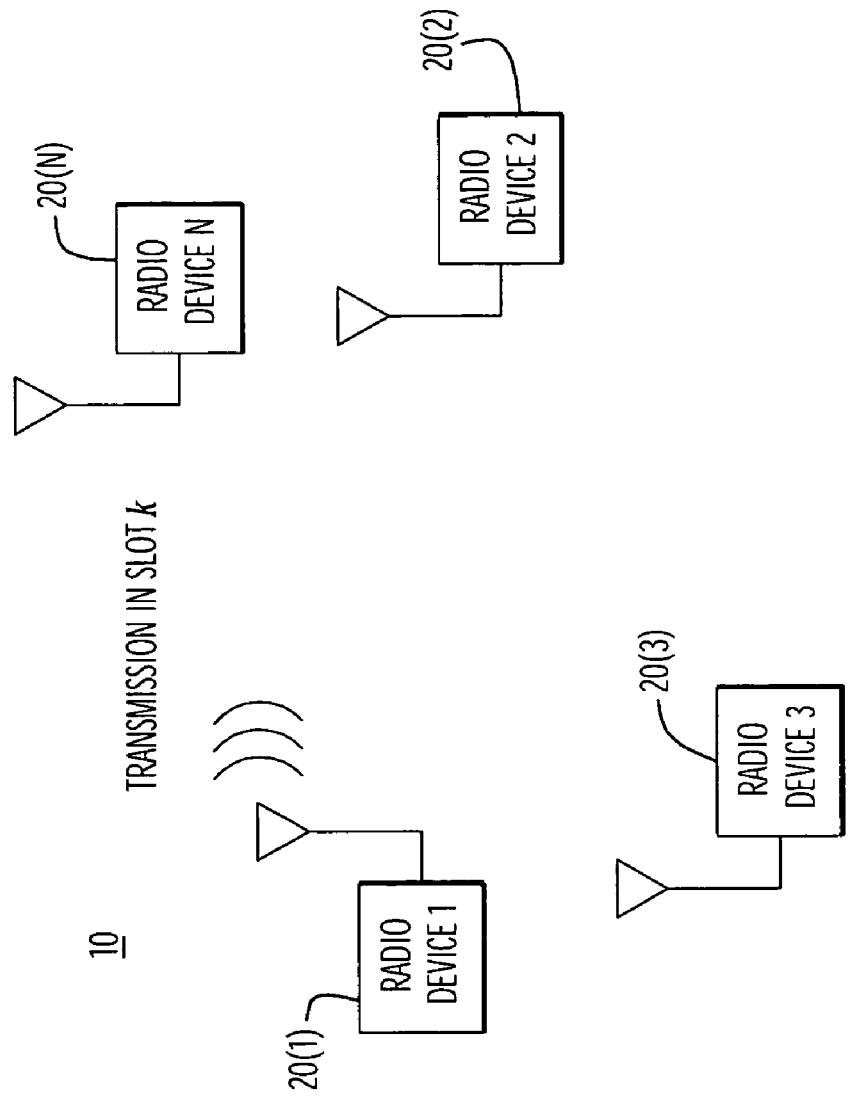
FIG. 1 is a block diagram of a radio system having radio communication devices that employ the power consumption conservation techniques described herein.

Referring first to FIG. 1, an example of a radio communication system 10 is shown comprising a plurality of radio devices 20(1) to 20(N). Devices in radio communication system 10 may share the communication medium using a time-slotted approach, such as TDMA. In TDMA systems, communication time slots are assigned for the devices. Thus, radio device 20(1) is assigned a time slot for transmission or reception, radio device 20(2) is assigned a different slot for transmission or reception, and so on. Each device in the system knows the time slot assignments of all the other devices, as well as the time slot boundaries and timing. Therefore, each device can determine when another device may be transmitting to it, and when the synchronization pattern for such a transmission should be occurring. Moreover, because a device is normally by default in receive mode (unless of course it has information to transmit), then in its default mode the device will activate its receiver for its assigned time slot to determine whether a transmission from another device is occurring, the device knows that there are no transmissions for it in its assigned time slot.

Briefly, the power savings techniques described herein involves enabling a receiver in a device after expiration of a first time interval that begins at the start of the time interval during which a possible transmission may be present. The receiver is kept enabled for at least a second time interval to determine whether a synchronization or other similar pattern is being transmitted by another device that indicates a transmission from another device is occurring for that device. The receiver is disabled at the end of the second time interval if the synchronization pattern is not detected during the second time interval. The first and second time intervals referred to above provide a significant power savings to the device in the event that a radio transmission is not occurring at the assigned time slot for that device. Thus, instead of enabling the receiver for the entire assigned time slot when a transmission for it may not actually be occurring, it is enabled for only a fraction of the time slot unless a synchronization pattern is detected. This dramatically lowers receiver power consumption. This savings is realized in those assigned time slots in which a device does not detect synchronization. Nevertheless, as indicated above, if a device knows that its assigned time slot is not in use, it can keep its receiver disabled or in its low power mode, often referred to as "idle". In FIG. 1 and the subsequent figures, this is explained in greater detail for the example where radio device 20(2) is assigned time slot k and radio device 20(1) has information to transmit to radio device 20(2).

Figure 2:
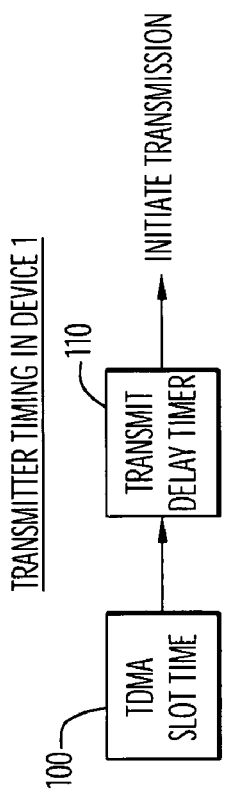
FIG. 2 is a block diagram of transmitter timing components in a radio communication device for transmitting a packet in an assigned time slot.
Figure 3:
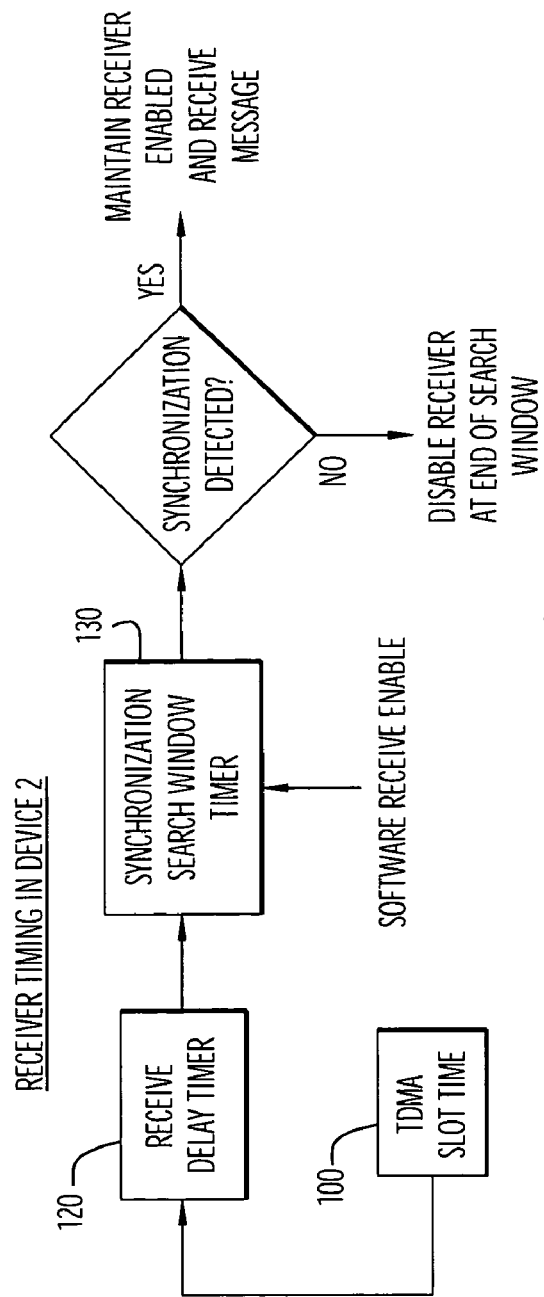
FIG. 3 is a block diagram of receiver timing components in a radio device that is to receive a packet in an assigned time slot.

Turning to FIGS. 2 and 3, the relevant additional hardware in each device for the power savings techniques will be described. Each device has a TDMA slot timer 100, a transmit delay timer 110 in a transmit path, and a receive delay timer 120 and a synchronization search window timer 130 in a receive path. The receive delay timer 120 is also referred to a first timer and the synchronization search window timer 130 is also referred to as a second timer. FIG. 2 shows the TDMA slot timer 100 and transmit delay timer 110 in radio device 20(1), and FIG. 3 shows the TDMA slot timer 100, receive delay timer 120 and synchronization search window timer 130 in radio device 2. Again, the example introduced above is carried forward to FIGS. 2 and 3, where radio device 20(1) is transmitting in time slot k to radio device 20(2). The TDMA slot timer 100 in each device is set up by software in that device. In radio device 20(1), when the TDMA slot timer times out, the transmit delay timer 110 is enabled since device 20(1) has information to transmit to radio device 20(2) in this example. Radio device 20(1) starts its transmission when the transmit delay timer expires. The transmit delay timer 110 allows for slight adjustment of the transmission during the assigned time slot to account for timing inaccuracies due to hardware delays, etc.

Similarly, in radio device 20(2), receive delay timer 120 is enabled by the TDMA slot timer 100 when the TDMA slot timer 100 times out. Thus, the receive delay timer 120 starts at a time slot boundary. When the receive delay timer 120 expires, the synchronization search window timer 130 enables the receiver. If synchronization for a transmission from another device is detected during this synchronization search window, the receiver is kept enabled until the complete transmission (message data) is received. On the other hand, if synchronization is not detected by the end of the synchronization search window, the receiver is disabled because there is no detectable transmission for radio device 20(2). The length of the synchronization search window is long enough for synchronization detection to occur based on system parameters including timing inaccuracies between the transmitting unit and receiving unit, radio frequency (RF) propagation delay and the length of the synchronization/acquisition sequence.

Figure 4:
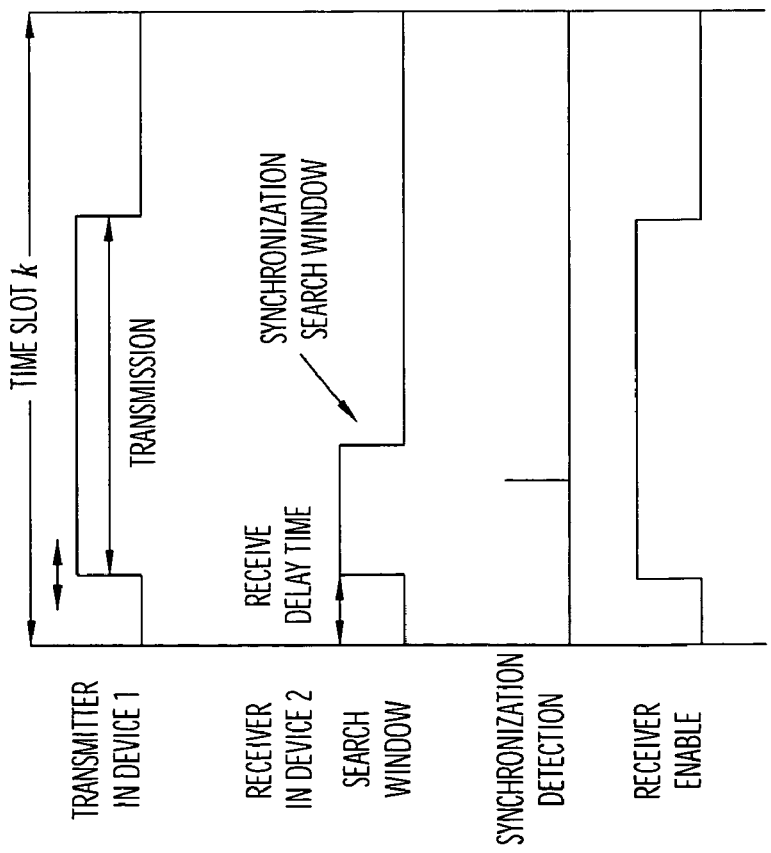
FIG. 4 is a timing diagram showing receiver timing according to the power reduction techniques described herein.

Turning to FIG. 4, a system timing diagram will be described to explain these power consumption savings techniques. The top signal shows the timing for setting up the transmitter, e.g., in radio device 20(1) and when it transmits. The bottom three signals are receiver timing signals, e.g., in radio device 20(2) to receive. Time Slot k shows when radio device 20(2) detects a synchronization pattern and Time Slot k' shows when radio device 20(2) does not detect a synchronization pattern. The short time interval before the synchronization search window in device 20(2) corresponds to delay time interval imposed by the receive delay timer to account for inherent delays that may occur in the transmitter of device 20(1). After the receive delay timer expires, the receiver in device 20(2) is then enabled for a time interval equal to the duration of the synchronization search window timer. If during this time interval radio device 20(2) detects a matching synchronization pattern, then the receiver in radio device 20(2) is kept enabled to detect the complete message. On the other hand, as shown for time slot k', if during the synchronization search window radio device 20(2) does not detect a matching synchronization pattern, then it will disable the receiver for the remainder of the time slot in order to save power. During the search window, the radio device 20(2) may search for type of signal or pattern that indicates a message transmission is present for that radio device.

As shown for slot k on the left-hand side of FIG. 4, the transmission may not begin precisely at the beginning of the assigned time slot due to the timing inaccuracies of the hardware in the devices. Therefore, the delay imposed by the receive delay timer serves to hold off enabling of the receiver for a short time interval at the beginning of the assigned time slot where it is very likely that a transmission could not yet be detected. Even if the transmission were to begin precisely at the beginning of the assigned time slot, the amount of time delay imposed by the receive delay timer is not significant enough that the synchronization pattern of the transmission would be completely missed. In fact, in that case it would likely be detected early on during the synchronization search window.

While the foregoing has been described with respect to device 20(1) transmitting to device 20(2), it should be understand that it is applicable any device transmitting to any other device in the system.

Figure 5:
FIG. 5 is a signal timing diagram of a transmission, and showing an acquisition/synchronization interval.

FIG. 5 shows an example of a transmission frame interval, including a short radio frequency ramp up (RFRU) interval, an acquisition/synchronization interval, a modulated data interval and a short radio frequency ramp down (RFRD) interval. The acquisition/synchronization interval may be a pseudo-random pattern of 1's and 0's derived from address or slot information for the destination device. The modulated data interval contains the message or packet data.

The receiver can be "enabled" in several ways. The clock signal(s) used to operate the receiver can be turned on or generated. The receive data path can be enabled with the clock signals always active. Alternatively, power can be connected (via a switch) to the receiver. Similarly, there are several ways that the receiver can be "disabled", depending on the degree of power savings desired balanced against performance (e.g., turn-on time). The most power savings can be achieved by disconnecting power to the receiver, whereas less power savings can be achieved by disconnecting power to the receiver with the receiver clock signal still being generated.

The amount of power that can be saved in a radio device depends on the slot time, acquisition sequence time and other system parameters. In one example, if the synchronization search window receiver power consumption is approximately 800 mW, receiver idle power consumption is 400 mW, the time slot duration is 10 msec and the synchronization search window is 1 msec. The average receiver power consumption can be reduced from 800 mW to 440 mW.

The foregoing techniques can be used to reduce power consumption in a variety of devices and applications, such as cell phones and military communication systems such as NTDR and Joint Tactical Radio System (JTRS).

Furthermore, these power savings techniques can be used in a non-slotted communication environment, such as in a handshaking protocol that involves a transmission by a source device to a destination device and an expected response from the destination device. Examples of such protocols include a Request to Send (RTS) packet followed by a Clear to Send (CTS) packet expected in response, and a message packet followed by an acknowledgement (ACK) packet in response. For example, if a first device wants to send a message packet to a second device in a system or network that uses the RTS/CTS medium access protocol, the first device transmits an RTS packet to the second device and waits to receive a CTS from the second device before sending the data packet or message. The first device will expect to receive the CTS from the second device within some period of time. To this end, the first device may have a receive delay timer and a CTS search window timer, similar to the synchronization search window timer described above. The first device enables the CTS search window timer after the receive delay timer expires and if it does not detect a CTS packet from the second device within that search window timer, the first device may disable its receiver. The receive delay timer is initiated at the beginning of the time interval when a CTS packet is expected to hold off enabling the receiver for short period of time before attempting to receive the CTS packet.

Figure 6:
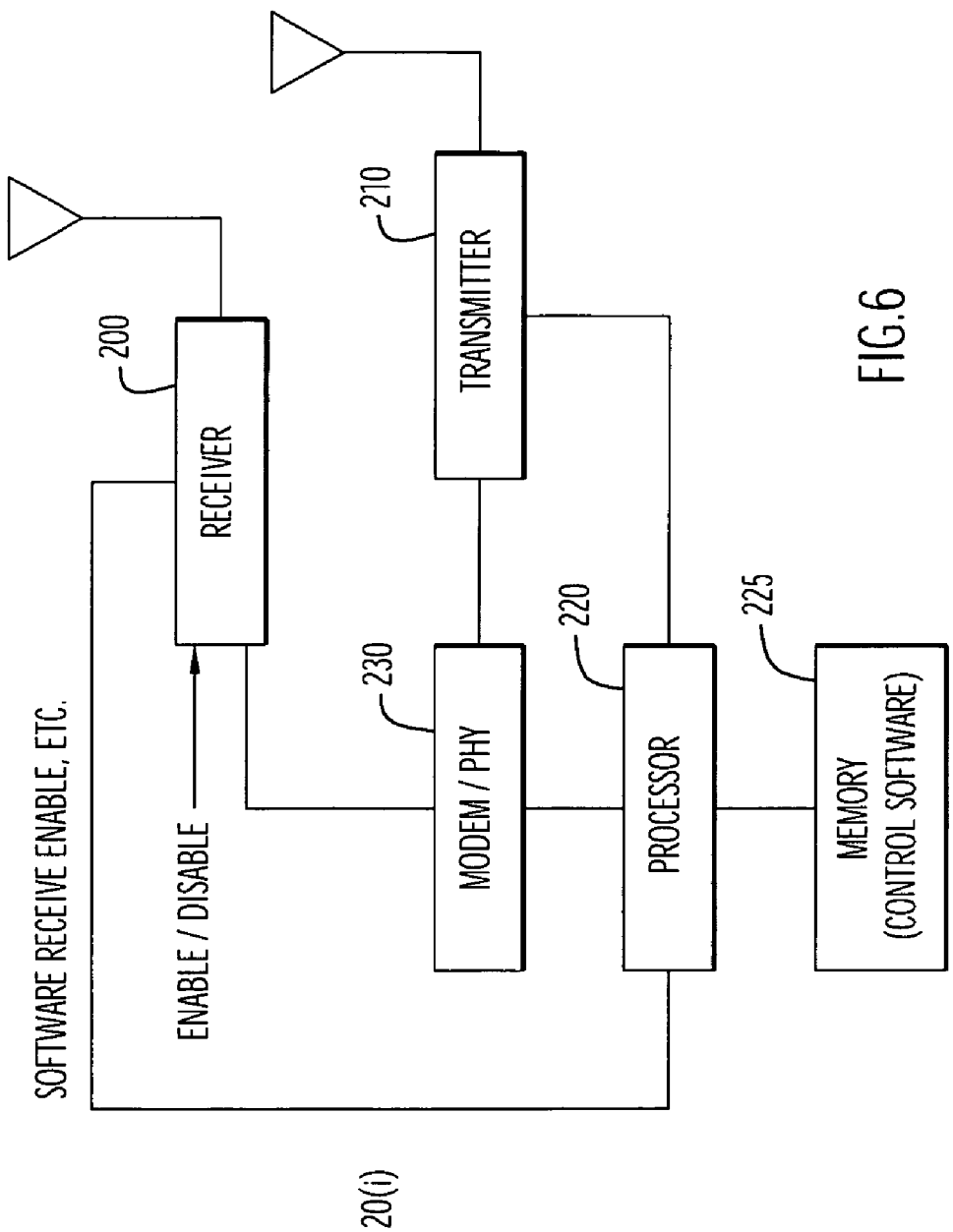
FIG. 6 is a block diagram of a radio device that uses the power savings techniques.

FIG. 6 illustrates a block diagram of a radio device 20(i) that performs the power savings techniques described herein. The radio device 20(i) comprises, among other elements, a receiver 200, a transmitter 210, a processor 220, a modem/PHY 230 and memory 225 that stores control software. The TDMA slot timer, transmit delay timer, receive delay timer and synchronization search window timer may be implemented in the modem/PHY 230 or by software executed by the processor 220. The processor 220 generates control signals to enable and disable the receiver. In addition, the processor activates the first timer at the beginning of the assigned time slot (when the TDMA slot timer times out), and activates the second timer when the first timer times out.

To summarize, a method is provided for reducing power consumption of a radio communication device, comprising: enabling a receiver in the radio communication device for a time interval that at least partially overlaps with an assigned time slot of the radio communication device during which a message may be transmitted to the radio communication device from another radio communication device, but which time interval is shorter in duration than the assigned time slot; during said time interval, detecting whether a synchronization pattern is being transmitted to the radio communication device, which synchronization pattern is indicative of a message transmission to the radio communication device; and maintaining the receiver enabled beyond the time interval if the synchronization pattern is detected during said time interval, otherwise placing the receiver in a low power consumption mode at expiration of the time interval.

Similarly, a method is provided for reducing power consumption of a radio communication device, comprising: determining a start of a reception time interval during which a transmission to the radio communication device is possible; after expiration of a first time interval that begins at the start of the reception time interval, enabling the receiver for at least a second time interval that expires prior to expiration of the reception time interval; during said second time interval, detecting whether a synchronization pattern is being transmitted to the radio communication device, which synchronization pattern is indicative of a transmission to the radio communication device from another radio communication device; and maintaining the receiver enabled beyond the second time interval during said reception time interval if the synchronization pattern is detected during said second time interval, otherwise disabling the receiver at expiration of the second time interval.

Further still, a method is provided for reducing power consumption of a radio communication device, comprising: after expiration of a first delay time interval that begins at the start of a time slot assigned to said radio communication device, enabling a receiver in the radio communication device for at least a second time interval that extends for a portion of the duration of the time slot; during said second time interval, detecting whether a synchronization pattern is being transmitted to the radio communication device which synchronization pattern indicates that another device is transmitting a message to said radio communication device during said time slot; and maintaining the receiver enabled if the synchronization pattern is detected during said second time interval, otherwise disabling the receiver for the remainder of the time slot.

Also provided is a radio communication device comprising: a radio receiver that receives wireless radio frequency energy including signals from other radio communication devices; a first timer that times out after a first time interval; a second timer that times out after a second time interval; and a processor coupled to the radio receiver, the first timer and the second timer. The processor activates the first timer at the start of a reception time interval of a possible transmission to the radio communication device from another radio communication device; activates the second timer after expiration of the first timer and enables the radio receiver in order to detect whether a synchronization pattern is being transmitted to the radio communication device during the second time interval, which synchronization pattern is indicative of a transmission to the radio communication device during said reception time interval; and maintains the receiver enabled beyond the second time interval during said reception time interval if the synchronization pattern is detected during the second time interval, otherwise disabling the receiver at expiration of the second time interval.

The system and methods described herein may be embodied in other specific forms without departing from the spirit or essential characteristics thereof. The foregoing embodiments are therefore to be considered in all respects illustrative and not meant to be limiting.

What is claimed is:

1. A method for reducing power consumption of a radio communication device, comprising:
   a. determining a start of a reception time interval comprising an assigned time slot during which the radio communication device may receive a transmission from another radio communication device, and wherein determining comprises monitoring a status of a time slot timer to determine the start of said assigned time slot when said time slot timer times out;
   b. after expiration of a first time interval that begins at the start of the reception time interval, enabling the receiver for at least a second time interval that expires prior to expiration of the reception time interval;
   c. during said second time interval, detecting whether a synchronization pattern is being transmitted to the radio communication device, which synchronization pattern is indicative of a transmission that follows the synchronization pattern during the reception time interval to the radio communication device from another radio communication device; and
   d. maintaining the receiver enabled beyond the second time interval during said reception time interval if the synchronization pattern is detected during said second time interval, otherwise placing the receiver in a low power consumption mode at expiration of the second time interval.

2. The method of claim 1, and further comprising activating a first timer in response to determining that the time slot timer has timed out, wherein the first timer has a duration equal to the first time interval.

3. The method of claim 2, and further comprising activating a second timer having a duration equal to the second time interval.

4. The method of claim 3, wherein placing the receiver in the low power mode comprises placing the receiver in the low power mode when the second timer times out without detection of the synchronization pattern.

5. The method of claim 1, wherein enabling comprises enabling the receiver for the second time interval that at least partially overlaps with the occurrence of the transmission to the radio communication device from another radio communication device that is responsive to a transmission from said radio communication device.

6. The method of claim 1, wherein enabling comprises one or both of: connecting power to the receiver, and activating generation of a clock signal for the receiver operations.

7. The method of claim 1, wherein placing the receiver in the low power mode comprises one or both of: disconnecting power to the receiver, and terminating generation of a clock signal for the receiver operations.

8. A method for reducing power consumption of a radio communication device, comprising:
   a. enabling a receiver in the radio communication device for a time interval that at least partially overlaps with an assigned time slot of the radio communication device during which a message may be transmitted to the radio communication device from another radio communication device, but which time interval is shorter in duration than the assigned time slot;
   b. during said time interval, detecting whether a synchronization pattern is being transmitted to the radio communication device, which synchronization pattern is indicative of a message transmission to the radio communication device; and
   c. maintaining the receiver enabled beyond the time interval if the synchronization pattern is detected during said time interval, otherwise disabling the receiver at expiration of the time interval.

9. The method of claim 8, wherein enabling comprises enabling the receiver in the radio communication device after expiration of a time interval that starts at the beginning of the assigned time slot.

10. The method of claim 8, wherein enabling comprises one or both of: connecting power to the receiver, and activating generation of a clock signal for the receiver operations.

11. The method of claim 8, wherein disabling comprises one or both of: disconnecting power to the receiver, and terminating generation of a clock signal for the receiver operations.

12. A radio communication device comprising:
   a radio receiver that is configured to receive wireless radio frequency energy including signals from other radio communication devices;
   a first timer that times out after a first time interval;
   a time slot timer that times out at the start of an assigned time slot;
   a second timer that times out after a second time interval; and
   a processor coupled to the radio receiver, the first timer and the second timer, wherein the processor is configured to:
      monitor the time slot timer to determine the start of the assigned time slot;
      activate the first timer at the start of a reception time interval corresponding to the assigned time slot during which the radio communication device may receive a transmission from another radio communication device;
      activate the second timer after expiration of the first timer and enable the radio receiver in order to detect whether a synchronization pattern is being transmitted to the radio communication device during the second time interval, which synchronization pattern is indicative of a transmission that follows the synchronization pattern to the radio communication device during said reception time interval; and
      maintain the receiver enabled beyond the second time interval during said reception time interval if the synchronization pattern is detected during the second time interval, otherwise disable the receiver at expiration of the second time interval which second time interval expires prior to expiration of the reception time interval.

13. The radio communication device of claim 12, wherein the processor enables the receiver for the second time interval that at least partially overlaps with the occurrence of the transmission to the radio communication device from another radio communication that is responsive to a transmission from said radio communication device.

14. The radio communication device of claim 12, wherein the processor enables the receiver by one or both of: causing connection of power to the receiver, and activating generation of a clock signal for the receiver operations.

15. The radio communication device of claim 12, wherein the processor disables the receiver by one or both of: causing disconnection of power to the receiver, and terminating generation of a clock signal for the receiver operations.

* * * * *